Dec. 7, 1926. Re. 16,502
R. A. McCANN
RAILWAY TRAFFIC CONTROLLING APPARATUS
Original Filed August 3, 1920
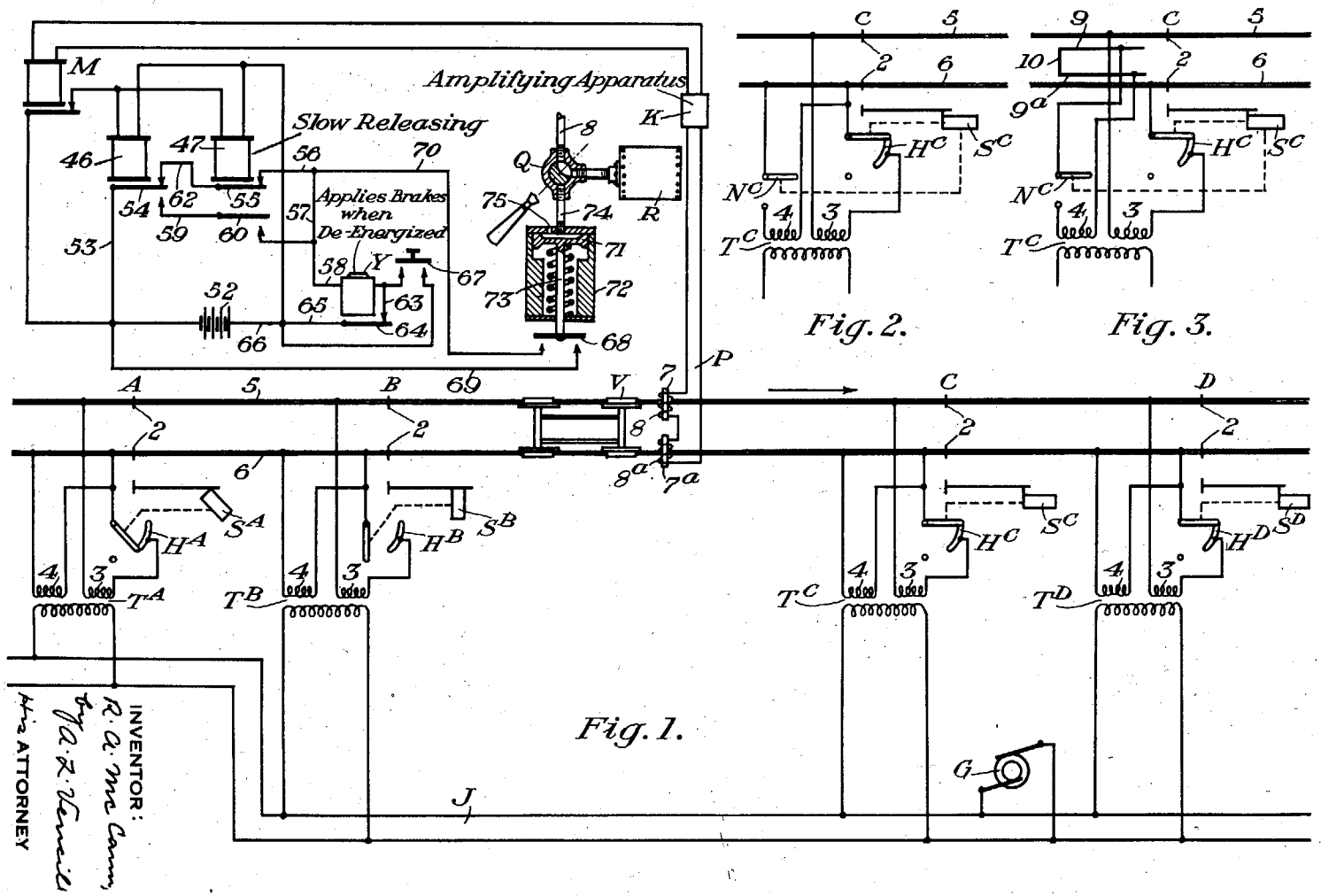

Reissued Dec. 7, 1926.

Re. 16,502

UNITED STATES PATENT OFFICE.

RONALD A. McCANN, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-TRAFFIC-CONTROLLING APPARATUS.

Original No. 1,492,719, dated May 6, 1924, Serial No. 401,018, filed August 3, 1920. Application for reissue filed September 5, 1924. Serial No. 736,180.

My invention relates to railway traffic controlling apparatus of the type wherein traffic governing means located on a car or train is controlled by energy received from the trackway, and the supply of energy from the trackway to the train depends upon traffic conditions in advance of the train. The present invention is particularly well adapted for, though not necessarily limited to, apparatus of this character in which the governing means on the train requires the constant supply of energy from the trackway to prevent an automatic application of the brakes.

In connection with systems of this nature, it has been proposed to provide apparatus under the control of the engineer for "suppressing" the automatic application of the brakes if the engineer takes suitable action at the time of cessation of the supply of energy from the trackway.

One feature of my present invention is the provision, in connection with apparatus of the character mentioned, of additional or auxiliary means located at intervals in the trackway, preferably adjacent to roadside signals, for supplying energy to the train after the cessation of the normal supply of energy, thereby causing an automatic application of the brakes when the auxiliary supply of energy ceases, unless the engineer prevents such application by again operating the suppressing apparatus already referred to.

I will describe certain forms of apparatus embodying my invention, and will then point out the novel features thereof in claims.

In the accompanying drawings, Fig. 1 is a diagrammatic view showing one form of apparatus embodying my invention, and Figs. 2 and 3 are diagrammatic views showing modifications of a portion of the trackway apparatus shown in Fig. 1.

Similar reference characters refer to similar parts in each of the views.

Referring first to Fig. 1, the reference characters 5 and 6 designate the track rails of a railway over which traffic normally moves in the direction indicated by the arrow, and which rails are divided by insulated joints 2 into a plurality of blocks A—B, B—C, C—D, etc. Located adjacent the entrance end of each block is a roadside signal designated by the reference character S with an exponent corresponding to the location. Each of these signals as here shown is of the semaphore type, adapted to indicate "stop", "caution" or "proceed", according as the semaphore is in the horizontal, inclined or vertical position. The apparatus for controlling these signals forms no part of my present invention, and, consequently, it is omitted from the drawing to simplify the disclosure. In accordance with usual practice, however, each signal indicates proceed when the corresponding block and the block next in advance are unoccupied, caution when the corresponding block is unoccupied and the block next in advance is occupied, and stop when the corresponding block is occupied. For example, as shown in the drawing, block B—C is occupied by a car or train V, so that signal $S^B$ indicates stop, and signal $S^A$ indicates caution.

Each block is provided with means for connecting a source of alternating vehicle governing current across the rails of the block at the exit end of the block. As here shown, this means comprises a transformer which is designated by the reference character T with an exponent corresponding to the location, which transformer is provided with a secondary 3 arranged to be connected at times across the rails of the block in the rear. The primary winding of each transformer is connected with a transmission line J, which is constantly supplied with alternating vehicle governing current by a suitable generator G. The circuit of the secondary 3 of each transformer includes a contact which is designated by the reference character H with an exponent corresponding to the location, which contact is controlled by the adjacent signal S in such manner that the contact is closed when the signal indicates proceed or caution, but open when the signal indicates stop. It follows that alternating vehicle governing current is supplied across the rails of each block when the signal for the block next in advance indicates caution or proceed, that is, when the said block next in advance is unoccupied, but that this source of current is disconnected from the rails of the block when the block next in advance is occupied.

The car or train V is provided with vehicle governing apparatus which includes two laminated soft iron cores 7 and 7ª mounted on the vehicle in advance of the forward axle and located over the two track rails 5 and 6, respectively. Each core is disposed transversely with respect to the rails, and the two cores are provided with windings 8 and 8ª, respectively. It is apparent, therefore, that when alternating current flows in either rail, part of the magnetic lines of force surrounding such rail will pass through the core which is directly over the rail and so will induce an alternating potential in the coil carried by such core.

The two coils 8 and 8ª are included in a receiving circuit P, the coils being connected in this circuit in such manner that the potentials created in the coils by alternating current flowing in opposite directions in the two track rails are additive. It follows, therefore, that an alternating potential is induced in the circuit P by current supplied to the track rails by the secondary 3 of each transformer T. The potential thus induced in the receiving circuit P is utilized to control the supply of current to a relay M, suitable amplifying apparatus K preferably being interposed between the receiving circuit and the winding of relay M. This relay will, consequently, be closed when coils 8 and 8ª are supplied with current from the tracks, and open when the coils are not so supplied with current.

Relay M controls two relays 46 and 47 in such manner that each of the latter relays is energized when relay M is closed, and de-energized when relay M opens. As here shown, relay 47 is of the slow-releasing type, but relay 46 is a quick-releasing relay. It follows that when relay M opens, relay 46 will open at once, but relay 47 will remain closed for a fixed interval of time.

Relays 46 and 47 control a brake application magnet Y which is arranged to cause an automatic application of the brakes when the magnet becomes de-energized. Magnet Y is energized when both relays 46 and 47 are closed and also when both of these relays are open. When the relays are closed, the circuit for magnet Y is from battery 52, through wire 53, upper point of contact 54 of relay 46, wire 62, upper point of contact 55 of relay 47, wires 56, 57, 58, winding of magnet Y, wire 63, contact 64 controlled by magnet Y, and wires 65 and 66 to battery 52. When relays 46 and 47 are open, the circuit for magnet Y is from battery 52, through wire 53, lower point of contact 54, wire 59, contact 60, wires 61 and 58, winding of magnet Y and thence as before to battery 52. It will be seen from the foregoing that when relay M opens, the circuit for magnet Y will at once be opened at contact 54 of relay 46, but that after a fixed interval of time, determined by the time characteristic of relay 47, magnet Y may again be energized by the operation of a push button 67 and the magnet will then remain energized as long as relay M is open. The push button 67 merely closes a shunt around the magnet-operated contact 64, and is preferably so located as to be accessible only when the train is standing still.

In order to prevent an automatic application of the brakes when relay M opens, means are provided for energizing magnet Y temporarily independently of relay contacts 54, 55 and 60. This means comprises a contact 68 controlled as hereinafter explained and connected in shunt with the contacts of relays 46 and 47. When circuit controller 68 is closed, the circuit for magnet Y is from battery 52, through wire 69, circuit controller 68, wires 70, 57 and 58, winding of magnet Y, wire 63, contact 64, and wires 65 and 66 to battery 52.

Circuit controller 68 is operated by a piston 71 moving in cylinder 72. The piston 71 is biased to its uppermost position by a spring 73, and when in this position circuit controller 68 is open. The piston 71 may be moved downwardly, however, in opposition too the action of the spring 73, by applying fluid pressure to the upper end of cylinder 72, and when this occurs circuit controller 68 is closed. Fluid pressure is supplied to the upper end of cylinder 72 by a reservoir R which is at times connected with the main reservoir of the braking system through pipe 8, and at other times with the upper end of cylinder 72 through pipe 74, the connections just mentioned being accomplished by a manually operable valve Q. This valve Q normally occupies the position shown in the drawing so that reservoir R is normally charged with main reservoir pressure. When it is desired to suppress an automatic application of the brakes, valve Q is swung in clockwise direction, so that reservoir R is connected with the upper end of cylinder 72 whereupon piston 71 is moved downwardly to close circuit controller 68. The air in reservoir R then flows out through an orifice 75 of restricted area, so that after a fixed interval of time, such for example, as 15 to 20 seconds, piston 71 returns to its initial position under the influence of spring 73. This time interval is obviously very much greater than the time required for relay 47 to release when relay M opens.

The operation of the parts of the apparatus thus far referred to is as follows:

When the car or train V occupies a block to the rails of which alternating current is supplied by the transformer secondary 3, magnet M is energized so that the car or train may proceed under the control of the engineer. When the car or train V passes a signal indicating caution, the supply of vehicle governing current is discontinued, so that magnet M will become de-energized and an automatic application of the brakes will occur unless the engineer acknowledges the caution signal. If the engineer reverses valve Q just prior to the opening of relay M, magnet Y remains energized during the interval of time required for the contacts of relay 47 to reverse, so that this magnet is maintained in energized condition until the second circuit for the magnet becomes closed.

It will be observed that when magnet Y is de-energized it cannot again become energized until push button 67 is closed. This push button is preferably located in such position on the vehicle as to require the vehicle to come to rest before the push button can be reached.

Assuming that the brake suppressing apparatus is set into operation by the engineer upon passing a caution signal, it will be clear that the car or train V may proceed at full speed and that if the next succeeding signal still indicates stop when it is reached by such car or train, the car or train may pass such signal and enter an occupied block at full speed. It is desirable, therefore, to provide means for causing an automatic application of the brakes at a stop signal unless the engineer takes suitable action to acknowledge such signal after having proceeded into a caution block by operation of the brake suppressing apparatus. To accomplish this I have provided additional or auxiliary means adjacent each signal for energizing the train-carried magnet M. In the form shown in Fig. 1 this is accomplished by an additional secondary 4 on each transformer T, the terminals of which are connected with suitably spaced points on the track rail 6. It will be seen, therefore, that as the car or train V approaches a stop signal, alternating current will be induced in winding $8^a$, so that magnet M will be energized. As soon as magnet M again becomes de-energized, due to the core $7^a$ passing the forward point of connection of transformer secondary 4, an automatic brake application will occur unless the engineer prevents such application by the proper manipulation of the valve Q.

The operation of the entire apparatus shown in Fig. 1 is as follows: I will assume that while block B—C is occupied by the car or train V, a second car or train equipped with similar apparatus approaches the point A. While such second car or train is in the block to the left of point A, its magnet M is energized, so that it may proceed at full speed. As the second car or train passes point A, however, its magnet M becomes de-energized, so that an automatic application of the brakes will occur unless such application is prevented by the manipulation of the valve Q. Assuming that the valve Q is manipulated by the engineer, the second car or train may proceed through block A—B at full speed, but upon reaching the exit end of this block magnet M will become energized due to the supply of current to the rail 6 by secondary 4 of transformer $T^B$. If the engineer then takes suitable action to acknowledge the stop signal $S^B$, the vehicle may enter block B—C without incurring an automatic application of the brakes, but if the engineer does not take such action the brakes will be applied immediately upon deenergization of magnet M and the car or train will be brought to a stop.

Referring now to Fig. 2, the apparatus here shown is the same as that shown in Fig. 1, except that the circuit for secondary 4 includes a contact $N^C$, which is operated by signal $S^C$ and is closed only when the signal indicates stop. The purpose of this contact is to conserve energy by keeping secondary 4 on open circuit except at such time as this secondary is to function.

In the modification shown in Fig. 3, the terminals of secondary 4 are connected with two wires 9 and $9^a$, which are located parallel with and close to the track rails 5 and 6, these wires being joined at their rear ends by a conductor 10. The circuit for secondary 4 includes a contact $N^C$ as in Fig. 2, although this contact can be omitted, if desired. When signal $S^C$ is in the stop position, the alternating current supplied to wires 9 and $9^a$ will cause the train-carried magnet M to become energized so that the operation of the apparatus shown in Fig. 3 is the same as that of the apparatus shown in Fig. 1.

Although I have herein shown and described only three forms of apparatus embodying my invention, it is understood that various changes and modifications may be made therein within the scope of the appended claims without departing from the spirit and scope of my invention.

Having thus described my invention, what I claim is:

1. Railway traffic controlling apparatus comprising train carried means requiring constant supply of energy from the trackway to prevent a brake application, means located in the trackway for supplying energy to said means under safe traffic conditions in advance but not under unsafe conditions, train carried apparatus under the control of the engineer for preventing a brake application upon cessation of energy from the trackway, and auxiliary means located at intervals in the trackway for supplying energy to a passing train after the cessation of energy from said first mentioned trackway means and thereby causing a brake application after the auxiliary supply of energy ceases unless the engineer prevents such application by operating said apparatus.

2. Railway traffic controlling apparatus comprising a railway track, signals located at intervals for governing the passage of trains along said track, means located in the trackway for supplying energy to the rails in the rear of each signal when the signal indicates proceed but not when it indicates stop, train carried means requiring constant supply of energy from the track to prevent an automatic application of the brakes, apparatus on the train under the control of the engineer for preventing an application of the brakes upon cessation of energy from the track, and auxiliary means located adjacent a signal for supplying energy to a passing train when the signal indicates stop, thereby causing an automatic brake application upon cessation of the auxiliary supply of energy unless the engineer acknowledges such stop signal by operating said apparatus.

3. Railway traffic controlling apparatus comprising a trackway divided into blocks, a signal adjacent the entrance to each block, means located in the trackway for supplying energy to the rails of each block when the signal for the block next in advance indicates proceed but not when it indicates stop, train carried means requiring constant supply of energy from the track to prevent an automatic application of the brakes, apparatus on the train under the control of the engineer for preventing an application of the brakes upon cessation of energy from the track, and auxiliary means located adjacent a signal for supplying energy to a passing train when the signal indicates stop, thereby causing an automatic brake application when the auxiliary supply of energy ceases unless the engineer acknowledges such signal by operating said apparatus.

4. Railway traffic controlling apparatus comprising train carried means requiring the constant supply of energy from the trackway to prevent an automatic application of the brakes, means located in the trackway and controlled by traffic conditions in advance for supplying energy to said train carried means, train carried apparatus under the control of the engineer for preventing a brake application upon cessation of energy from the trackway, and auxiliary means located at intervals in the trackway for supplying energy to a passing train after the cessation of energy from said first mentioned trackway means and thereby causing a brake application when the auxiliary supply ceases unless the engineer prevents the same by operating said apparatus.

5. Railway traffic controlling apparatus comprising train carried means arranged when de-energized to cause an application of the brakes, means located in the trackway and controlled by traffic conditions in advance for supplying energy to said train carried means, train carried apparatus under the control of the engineer for preventing a brake application when said train carried means becomes de-energized, and auxiliary means located in the trackway for supplying energy to said train carried means after the latter becomes de-energized and thereby causing a brake application when the auxiliary supply of energy ceases unless the engineer prevents the same by operating said apparatus.

6. Railway traffic controlling apparatus comprising train carried electrical apparatus, means for constantly energizing said apparatus from the trackway under clear traffic conditions and operating when the train approaches a danger zone to de-energize and subsequently re-energize said apparatus, brake applying means on the train normally rendered operative by the de-energization of said apparatus, and means on the train under the control of the engineer for preventing a brake application when said apparatus becomes de-energized.

7. Railway traffic controlling apparatus comprising train carried electrical apparatus, means located partly on the train and partly in the trackway for energizing said apparatus under clear traffic conditions and operating when the train approaches a stop signal to de-energize and subsequently re-energize said apparatus, brake applying means on the train normally requiring constant supply of energy from the trackway to prevent an automatic application of the brakes, and means on the train under the control of the engineer for preventing a brake application when said apparatus becomes de-energized.

8. Railway traffic controlling apparatus comprising normally energized train carried electrical apparatus requiring constant supply of energy from the trackway to prevent an automatic application of the brakes; means controlled from the trackway for successively de-energizing, energizing and de-energizing said apparatus while the train is approaching another train; and means on the train under control of the engineer for preventing a brake application due to de-energization of said apparatus.

9. Railway traffic controlling apparatus comprising normally energized train carried electrical apparatus requiring constant supply of energy from the trackway to prevent an automatic application of the brakes; means controlled from the trackway for successively de-energzing, energizing and de-energizing said apparatus while the train is passing from a caution to a stop signal; and means on the train under control of the engineer for preventing a brake application due to de-energization of said apparatus.

10. In combination, a train carried magnet, mechanism on said train controlled by said magnet and effective to apply the brakes when the magnet becomes deenergized, and means located in the trackway for continuously supplying energy to said magnet under safe traffic conditions but for successively de-energizing, re-energizing and de-energizing said magnet as the train proceeds under unsafe traffic conditions.

11. In combination, a train carried magnet, mechanism on said train controlled by said magnet and effective to apply the brakes when the magnet becomes de-energized, and means located in the trackway for continuously supplying energy to said magnet under safe traffic conditions but for successively de-energizing, re-energizing and de-energizing said magnet as the train proceeds under unsafe traffic conditions, and means on the train under the control of the engineer for preventing a brake application due to de-energization of said magnet.

12. In combination, a train carried magnet, mechanism on said train controlled by said magnet and effective to apply the brakes when the magnet becomes de-energized, and means located in the trackway for continuously supplying energy to said magnet under safe traffic conditions but for successively de-energizing, re-energizing and de-energizing said magnet as the train proceeds under unsafe traffic conditions, and manually operable means on the train effective for an interval of time to prevent a brake application due to de-energization of said magnet.

13. In combination, a railway train, a magnet on the train arranged to apply the brakes when the magnet is de-energized, a first circuit for said magnet including a front contact of the magnet and a contact adapted to be opened when the train enters an occupied section or the section next in rear of an occupied section, a manually operable circuit controller on the train adapted to be normally open but to be closed for a time interval when actuated, a second circuit for said magnet including said circuit controller and the front contact of the magnet, and a third circuit for said magnet arranged to be closed before the expiration of said time interval to maintain said magnet in its energized condition if said circuit controller is actuated.

14. In combination, a railway train, a device on the train arranged to cause an automatic application of the brakes when de-energized, means partly on the train and partly in the trackway for normally maintaining said device in its energized condition but for de-energizing said device when the train enters an occupied section or the section in rear of an occupied section, means effective for a time interval if the engineman takes suitable action for preventing such de-energization of said device, and means for maintaining said device in its energized condition after the expiration of said interval only if the engineman has taken such suitable action.

15. In combination, normally energized train carried apparatus arranged when de-energized to apply the brakes, means located in the trackway for continuously supplying energy to said apparatus under safe traffic conditions and for successively de-energizing, re-energizing and de-energizing said apparatus as the train proceeds under unsafe traffic conditions, and means on the train under control of the engineer for preventing a brake application due to de-energization of said apparatus.

16. In combination, normally energized train carried apparatus arranged when de-energized to apply the brakes, means located in the trackway for continuously supplying energy to said apparatus under safe traffic conditions and for successively de-energizing, re-energizing and de-energizing said apparatus as the train proceeds under unsafe traffic conditions.

17. In combination, a train carried electro-responsive apparatus, means located in the trackway for continuously supplying energy to said apparatus under safe traffic conditions but for successively de-energizing, re-energizing and de-energizing said apparatus as the train proceeds under unsafe traffic conditions in advance, brake applying mechanism on the train, means on the train for holding said mechanism in inactive condition while said apparatus is energized and for also holding said mechanism in inactive condition after a time interval following de-energization of said apparatus provided said mechanism has been held in inactive condition during such time interval, and manually operable means on the train for holding said mechanism in inactive condition for a greater time interval.

18. In combination, train carried electro-responsive apparatus, means located in the trackway for continuously supplying energy to said apparatus under safe traffic conditions but not under unsafe traffic conditions, auxiliary means located in the trackway for subsequently energizing and de-energizing said apparatus as the train proceeds under unsafe traffic conditions, and mechanism on the train effective to apply the brakes when said apparatus becomes de-energized.

19. In combination, train carried electro-responsive apparatus, means located in the trackway for continuously supplying energy to said apparatus under safe traffic conditions but not under unsafe traffic conditions, auxiliary means located in the trackway for subsequently energizing and de-energizing said apparatus as the train proceeds under unsafe traffic conditions, and mechanism on the train effective to apply the brakes when said apparatus becomes de-energized, and manually operable means on the train for preventing a brake application due to de-energization of said apparatus.

In testimony whereof I affix my signature.

RONALD A. McCANN.